United States Patent [19]
Ueno et al.

[11] Patent Number: 6,003,832
[45] Date of Patent: Dec. 21, 1999

[54] MOLD OF A PHOTOCURED RESIN CONTAINING A REINFORCING AGENT

[75] Inventors: Takakuni Ueno; Yorikazu Tamura, both of Kawasaki, Japan

[73] Assignee: Teijin Seiki Co., Ltd., Osaka, Japan

[21] Appl. No.: 08/694,495

[22] Filed: Aug. 7, 1996

[30] Foreign Application Priority Data

Dec. 26, 1995 [JP] Japan .................................. 7-339028

[51] Int. Cl.$^6$ ...................................................... B28B 7/34
[52] U.S. Cl. ........................ 249/135; 249/134; 425/542
[58] Field of Search ................... 249/134, 135; 425/542

[56] References Cited

U.S. PATENT DOCUMENTS

| | | | |
|---|---|---|---|
| 5,260,009 | 11/1993 | Penn ........................................ | 264/40.1 |
| 5,439,622 | 8/1995 | Pennisi et al. ............................ | 264/22 |
| 5,591,563 | 1/1997 | Suzuki et al. . | |
| 5,653,932 | 8/1997 | Aida et al. ............................... | 264/219 |
| 5,679,722 | 10/1997 | Tamura ..................................... | 522/96 |
| 5,700,406 | 12/1997 | Menhennett et al. .................. | 264/40.4 |

FOREIGN PATENT DOCUMENTS

| | | |
|---|---|---|
| 0 535 828 | 4/1993 | European Pat. Off. . |
| 0 642 903 | 3/1995 | European Pat. Off. . |
| 56-144478 | 11/1981 | Japan . |
| 2-38422 | 8/1990 | Japan . |
| WO 97 17190 | 5/1997 | WIPO . |

OTHER PUBLICATIONS

Database WPI Section Ch, Week 9433Aug. 1994, ClassA18, AN 94–269490'33! & JP 06 199962.
Patent Abstracts of Japan, vol. 095, No. 004, May 31, 1995 & JP 07 026062 A.
Patent Abstracts of Japan, vol. 096, No. 005, May 31, 1996 & JP 08 020620 A.
Hull, A. "Stereolithography as a Tool for Prototype Moulds", Kunststoffe Europe, No. 3/04, Dec. 1, 1991, pp. 334–337.
"Prototyping that Bypasses Model Construction", Modern Plastics International, vol. 24, No. 11, Nov. 1, 1994, p. 25/26.

*Primary Examiner*—David W. Wu
*Attorney, Agent, or Firm*—Michael N. Meller

[57] ABSTRACT

A mold having a cavity for shaping a three-dimensional object, which comprises a photocured resin of a photocurable resin composition comprising (A) a liquid photocurable resin, and
(B) at least one reinforcing agent selected from the group consisting of inorganic solid particles having an average particle diameter of 3 to 70 μm and a whisker having an average diameter of 0.3 to 1.0 μm, a length of 10 to 70 μm and an aspect ratio of 10 to 100 and optionally, in which the inner surface of the cavity is covered by a solid film having a thickness of 5 to 1000 μm.

15 Claims, 2 Drawing Sheets

MOLD OF A PHOTOCURED RESIN CONTAINING A REINFORCING AGENT

BRIEF DESCRIPTION OF THE INVENTION

This invention relates to a mold of a photocured resin having a cavity for shaping a three-dimensional object. More specifically, it relates to a mold of a photocured resin which is suitable for the production of a three-dimensional object as a trial product.

BACKGROUND OF THE INVENTION

A method for optically shaping a product master model is known (see JP-A 56-144478 (the term "JP-A" as used herein means an "unexamined published Japanese patent application") and JP-B 2-38422 (the term "JP-B" as used herein means a "Japanese patent publication")). It is also known that a mold (such as a simple mold) is produced by a resin molding method using this model.

The prior art process of producing a mold by a resin molding method will be explained with reference to FIG. 2. FIG. 2(A) shows a state that a model 101 and a parting line jig 103 are to be combined and FIG. 2(B) shows a state that they are combined. This model 101 is optically shaped. The parting line jig 103 is formed by machining, hand finishing or the like.

Thereafter, as shown in FIGS. 2(C) and 2(D), the combined model 101 and parting line jig 103 are surrounded by a frame 105 (such as an acrylic plate), and a cavity mold 107 is formed on the parting surface 111 of the model 101 and the parting surface 131 of the parting line jig 103 by a resin molding method (using, as a resin, epoxy resin containing aluminum powder or the like), and cured. Then, as shown in FIG. 2(E), the frame is removed, the combination is turned upside down, and the parting line jig 103 is removed. Thereafter, a drill hole (dowel hole 175) for aligning a core mold with a cavity mold is formed in the parting surface 171 of the cavity mold 107.

Subsequently, as shown in FIGS. 2(F) and 2(G), an assembly of the model 101 and the cavity mold 107 is surrounded by a frame 105, a release agent is applied to the inner surface 115 and parting surface 111 of the model 101, and a core mold 108 is formed on these surfaces by a resin molding method, and cured. Thereafter, the core mold 108 and the cavity mold 107 are separated from each other to remove the model 101. As shown in FIG. 2(H), both molds are combined, bound together by a constraint jig 109 and heated to complete a mold.

In the prior art process of producing a mold, it is only a master model which is optically shaped, and a mold is fabricated through a process for transcribing a model, such as gypsum casting, spray depositing or the like in addition to the above-described resin molding. Heretofore, no photocured resin is available which has satisfactory properties as a mold material and hence, it has been considered that it is impossible to fabricate a mold itself by an optical shaping process.

The prior art method for producing a mold by a transcription process involves the following problems.

(1) The preparation of a master model is required and it takes time and labor.
(2) When a mold is fabricated by transcribing a master model, dimensional accuracy and shape accuracy are deteriorated by transfer.
(3) The transcription of a master model takes time and labor.
(4) The transcription of a master model requires the skills of an expert. For example, the skills are required for determining the parting surface, manufacturing a parting line jig, controlling the temperature of a resin, mixing and defoaming.
(5) The mold manufacturing process is needed additional steps due to preparation of a master model and the transcription works.

SUMMARY OF THE INVENTION

The inventors of the present invention have conducted intensive studies to provide a simple mold which can be produced with high accuracy in a small number of steps and at a low cost in a short period of time and as a result, have succeeded in creating a new technical basic concept which breaks down the conventional technical common knowledge that what is manufactured by an optical shaping process is a master model and not a mold itself.

It is therefore an object of the present invention to provide a mold for shaping a three-dimensional object which is optically shaped from a specific resin composition.

It is another object of the present invention to provide a shaping mold which can be used to shape a three-dimensional object a large number of times, that is, can provide a large number of completely shaped three-dimensional objects, and has improved service life.

It is still another object of the present invention to provide a shaping mold which can provide almost the same number of completely shaped three-dimensional objects.

Other objects and advantages of the present invention will become apparent from the following description.

According to the present invention, the above objects and advantages are attained, firstly, by a mold having a cavity for shaping a three-dimensional object, which comprises a photocured resin of a photocurable resin composition comprising:

(A) a liquid photocurable resin, and
(B) at least one reinforcing agent selected from the group consisting of inorganic solid particles having an average particle diameter of 3 to 70 μm and a whisker having an average diameter of 0.3 to 1.0 μm, a length of 10 to 70 μm and an aspect ratio of 10 to 100.

Figure 1A:
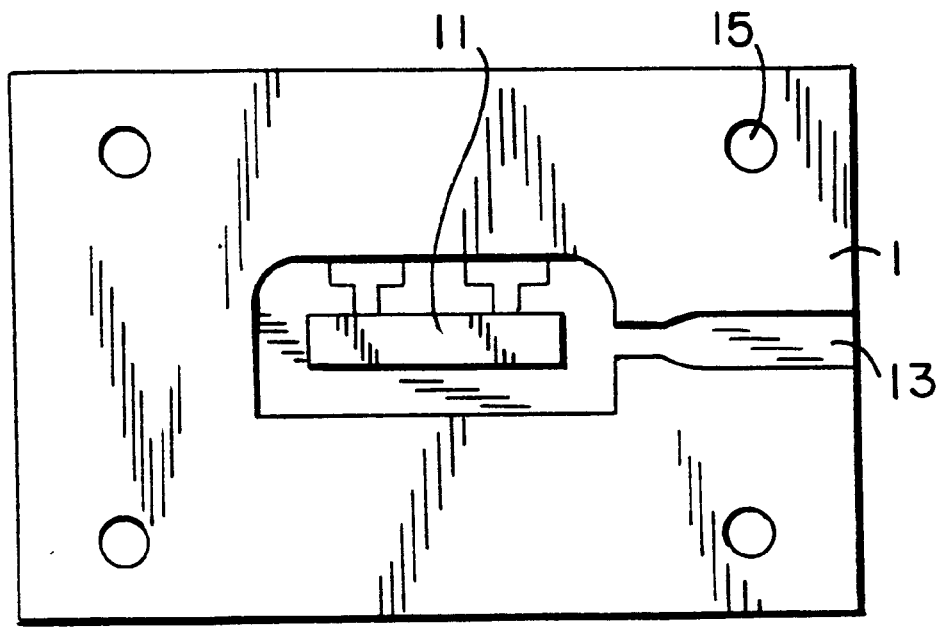
FIG. 1 is a schematic view for explaining the structure of a mold of the present invention, particularly a mold for injection molding.

The term "optical shaping" as used in this specification refers to, in a narrow sense, an optical shaping for obtaining a predetermined shape by curing a photocurable resin by irradiation of light (such as a visible ray, laser beam and ultraviolet ray) and further to a shaping system which uses an appropriate fluid medium which is photocured by a reactive energy ray such as an electron beam or high-energy particle beam. Further, it also refers to a shaping system which uses a lithography technique for projecting the above energy or a substance through a mask.

As an unsaturated compound for the liquid photocurable resin used in the present invention, a polymerizable vinyl compound and an epoxy compound are preferably used.

The unsaturated compound may be either monofunctional or polyfunctional and either a monomer or an oligomer.

Illustrative examples of the oligomer include monofunctional and polyfunctional urethane acrylate oligomers, epoxy acrylate oligomers and ester acrylate oligomers.

Illustrative examples of the monofunctional monomer include acrylic compounds such as isobornyl acrylate, isobornyl methacrylate, dicyclopentenyl acrylate, dicyclopentenyloxyethyl acrylate, dicyclopentenyloxyethyl methacrylate, dicyclopetanyl acrylate, dicyclopetanyl methacrylate, bornyl acrylate, bornyl methacrylate, 2-hydroxyethyl acrylate, cyclohexyl acrylate, 2-hydroxypropyl acrylate, morpholine acrylamide, morpholine methacrylamide and phenoxyethyl acrylate; and other monofunctional vinyl monomers such as N-vinyl pyrrolidone, N-vinyl caprolactam, acrylamide, vinyl acetate and styrene.

Illustrative examples of the polyfunctional monomer include trimethylolpropane triacrylate, ethylene-oxide modified trimethylolpropane triacrylate, ethylene glycol diacrylate, tetraethylene glcol diacrylate, polyethylene glycol diacrylate, 1,4-butanediol diacrylate, 1,6-hexanediol diacrylate, neopentyl glycol diacrylate, dicyclopentanyl diacrylate, polyester diacrylate, ethylene-oxide modified bisphenol A diacrylate, pentaerythritol triacrylate, pentaerythritol tetraacrylate, propylene-oxide modified trimethylolpropane triacrylate, propylene-oxide modified bisphenol A diacrylate, tris(acryloxyethyl)isocyanurate and the like.

Further, illustrative examples of the epoxy compound include hydrogenated bisphenol A diglycidyl ether, 3,4-epoxycyclohexylmethyl-3,4-epoxycyclohexane carboxylate, 2-(3,4-epoxycyclohexyl-5,5-spiro-3,4-epoxy) cyclohexane-metha-dioxane, bis(3,4-epoxycyclohexylmethyl)adipate and the like.

These unsaturated compounds may be used alone or in combination of two or more.

The liquid photocurable resin may contain a photopolymerization initiator or a thermal polymerization initiator in addition to the unsaturated compound.

Typical examples of the photopolymerization initiator include 2,2-dimethoxy-2-phenyl acetophenone, 1-hydroxycyclohexylphenyl ketone, acetophenone, benzophenone, xanthone, fluorenone, benzaldehyde, fluorene, anthraquinone, triphenylamine, carbazole, 3-methyl acetophenone, Michler's ketone and the like. These initiators may be used alone or in combination of two or more. Further, they can be used in combination with an sensitizer such as an amine compound as required.

Typical examples of the thermal polymerization initiator include benzoyl peroxide, t-butyl peroxybenzoate, dicumyl peroxide, diisopropyl peroxydicarbonate, t-butyl peroxide, azobisisobutyronitrile and the like.

When an epoxy compound is used, an energy active cation initiator such as triphenyl sulfonium hexafluoroantimonate may be used advantageously.

The resin composition of the present invention comprises either an inorganic solid particle or whisker, or both, as a reinforcing agent.

The inorganic solid particle needs to have an average particle diameter of 3 to 70 $\mu$m. If the average particle diameter is less than 3 $\mu$m, the viscosity of the resin composition becomes too high, thereby making it difficult not only to blend a predetermined amount of the inorganic solid particles but also to handle during optical shaping. If the average particle diameter is more than 70 $\mu$m, though an increase in the viscosity of the resin composition is not so large, the diffusion of irradiation energy (light, for example) for curing occurs, thereby not only deteriorating shaping accuracy but also leading to a reduction in the accuracy of a shaped article due to restriction on the film thickness of each layer to be laminated, both of which are not preferred.

The average particle diameter of the inorganic solid particle is preferably in the range of 10 to 60 $\mu$m, more preferably 15 to 50 $\mu$m. When the average particle diameter is within the above range, a resin composition having good balance between shapability and accuracy can be obtained depending on the proportion of a reinforcing agent.

The inorganic solid particle is used as the sole reinforcing agent in the resin composition in an amount of 5 to 70% by volume based on the total volume of the liquid curable resin and the inorganic solid particle.

If the proportion of the inorganic solid particle is less than 5% by volume, the characteristic properties of the inorganic solid particle are not developed fully. Particularly, a cured product obtained by curing the resin composition does not meet requirements for the mechanical properties of a simple mold and hence, is not put to use. If the proportion is more than 70% by volume, the average particle diameter of the inorganic solid particle usable is limited and the viscosity of the resulting resin composition is extremely high, thereby making it difficult to use it for shaping.

The proportion of the inorganic solid particle in the resin composition is preferably 20 to 65% by volume, more preferably 30 to 60% by volume. This range is advantageously used to achieve shapability and the characteristic properties of a simple mold.

Although the inorganic solid particle used in the present invention may be transparent or opaque, it is preferably spherical in shape, more preferably exactly spherical. When the inorganic solid particle is not spherical, the irregular reflection of irradiation energy (light, for example) occurs and the accuracy of a three-dimensional object obtained by curing the resin composition may be lost. In addition, the viscosity of the resin composition tends to increase. As for the sphericity of the inorganic solid particle, it is desired to use an inorganic solid particle which has a relative standard deviation defined by the following formula of less than 0.5.

$$\text{relative standard deviation} = \sqrt{\frac{\sum_{i=1}^{n}(D_i - \overline{D})^2}{n}} \bigg/ \overline{D}$$

wherein $D_i$ ($\mu$m) is a diameter of the area circle of each particle, $\overline{D}$ ($\mu$m) is an average value of the diameter of the area circle defined by the following formula $$\overline{D} = \sum_{i=1}^{n} D_i / n$$

and n is the number of particles.

Preferred examples of the inorganic solid particle include a glass particle (bead), talc particle and silica particle. They may be used alone or in combination of two or more.

The inorganic solid particle treated with a silane coupling agent can be used preferably. Preferred examples of the silane coupling agent include amino silane, epoxy silane, vinyl silane, acryl silane and the like.

Specific examples of the amino silane coupling agent include γ-aminopropyltriethoxysilane, N-β (aminoethyl) γ-aminopropyltrimethoxysilane and N-β (aminoethyl) γ-aminopropylmethyldimethoxysilane.

Specific examples of the epoxy silane coupling agent include β-(3,4-epoxycyclohexyl)ethyltrimethoxysilane and γ-glycidoxypropyltrimethoxysilane.

Specific examples of the vinyl silane coupling agent include vinyl trichlorosilane, vinyltriethoxysilane and vinyltris(β-methoxyethoxysilane).

Specific examples of the acryl silane coupling agent include trimethoxysilanemethacrylate.

When the inorganic solid particle treated with such a silane coupling agent is used, a cured product having greatly improved mechanical strength, in particular, is obtained from the resulting resin composition. The silane coupling agent develops different degrees of curability depending on a liquid photocurable resin used. For instance, when an unsaturated vinyl compound is used as the liquid photocurable resin, an inorganic solid particle treated with an acryl silane coupling agent Is preferably used, and, when an epoxy compound is used, an inorganic solid particle treated with an epoxy silane coupling agent is preferably used.

The resin composition in the present invention can use a whisker as a reinforcing agent in place of or in combination with the inorganic solid particle.

The whisker used in the present invention needs to have an average diameter of 0.3 to 1.0 $\mu$m, a length of 10 to 70 $\mu$m and an aspect ratio of 10 to 100.

The preferable average diameter is 0.3 to 0.7 $\mu$m, the preferable length is 20 to 50 $\mu$m and the preferable aspect ratio is 20 to 70.

If the aspect ratio of the whisker in use is less than 10, the effects of improving the mechanical strength and reducing the volume shrinkage of the resulting cured product cannot be obtained, and the viscosity of the resin composition increases disadvantageously. If the aspect ratio of the whisker is large, the effects of improving the mechanical strength and reducing the volume shrinkage of the resulting cured product are expected. However, if the aspect ratio is too large, the viscosity and fluid elasticity of the resin composition become high, resulting in a difficult shaping operation, a large length of the whisker and deteriorated accuracy of the side surface of the resulting cured product.

The whisker is used as the sole reinforcing agent in the resin composition in an amount of 5 to 30% by volume based on the total volume of the liquid photocurable resin and the whisker.

If the proportion of the whisker is less than 5% by volume, the characteristic properties of the whisker are not developed fully, and a cured product obtained by curing the resin composition does not exhibit sufficient mechanical strength. If the proportion is more than 30% by volume, the viscosity of the resulting resin composition becomes extremely high, thereby making it difficult to use it for shaping.

DESCRIPTION OF THE PREFERRED EMBODIMENTS

As the whisker, what has been treated with a silane coupling agent can be used preferably.

Illustrative examples of the silane coupling agent are the same as those provided in connection with the inorganic solid particle.

Preferred examples of the whisker include whisker of aluminum borate and derivatives thereof, whisker of hydroxy magnesium sulfate and derivatives thereof, whisker of aluminum oxide and whisker of silicon oxide. They may be used alone or in combination of two or more.

When the resin Composition comprises a combination of an inorganic solid particle and a whisker as a reinforcing agent, the reinforcing agent is used in an amount of 5 to 70% by volume based on the total volume of the liquid curable resin and the reinforcing agent.

Illustrative examples of the inorganic solid particle and the whisker are the same as those provided hereinbefore.

Since the resin composition comprises a combination of an inorganic solid particle and a whisker as a reinforcing agent, the mechanical properties and heat resistance of the resulting cured product are significantly improved and the volume shrinkage of the product is greatly reduced by the synergism of the inorganic solid particle and whisker.

The ratio of the volume amount of the inorganic solid particle to the volume amount of the whisker is preferably between 7:3 and 1:1.

Within this range of the ratio, it is more preferred to set the proportion of the inorganic solid particle to 5 to 65% by volume, that of the whisker to 5 to 30% by volume and the total of both to 10 to 70% by volume. It is the most preferred to set the proportion of the inorganic solid particle to 10 to 50% by volume, that of the whisker to 5 to 20% by volume and the total of both to 20 to 60% by volume.

The photocurable resin composition used in the present invention may contain a leveling agent, surfactant, organic polymer compound, organic plasticizer, organic filler other than those provided hereinbefore, inorganic filler other than those provided hereinbefore, and the like as required.

Preferred examples of the organic filler include organic polymer solid particles having an average particle diameter of 3 to 70 $\mu$m, such as crosslinked polystyrene polymer particles, crosslinked polymethacrylate polymer particles, polyethylene polymer particles and polypropylene polymer particles. The total amount of the organic filler and the inorganic solid particle is 70% by volume based on the resin composition.

Preferably, a material constituting the mold of the present invention has a hardness in terms of a Rockwell surface hardness index of M-30 or more and a flexural modulus of 400 kg/mm$^2$ ore more. It is possible to obtain these properties from a photocurable resin which is blended with the above reinforcing agent. When the material has such mechanical physical properties, it is satisfactorily usable as a material for a simple mold which undergoes a relatively small load. Illustrative examples of the simple mold include aluminum plate press molds, plastic injection molding molds, foaming molding molds, RIM (reaction injection molding) molds and vacuum casting molds. Further, to improve the durability and molding accuracy of a mold, it is desirable that the hardness in terms of the Rockwell surface hardness index be M-50 or more and the flexural modulus be 600 kg/mm$^2$ or more. It is possible to obtain these properties from a photocurable resin blended with the above reinforcing agent and a special inorganic reinforcing agent.

Preferably, the material constituting the mold of the present invention has a heat conductivity of 0.3 Kcal/m·Hr·° C. or more. Especially, when heat must be let escape from the inside of the mold to the outside like an injection mold, it is desirable that such heat conductivity be provided to a mold. Further, to increase the molding rate, the heat conductivity is preferably 0.4 Kcal/m·Hr·° C. or more.

The preferred mold in the present invention is such that the inner surface of the cavity for shaping a three-dimensional object is covered by a solid film having a thickness of 5 to 1,000 $\mu$m. Due to this solid film formed on the inner surface, i.e., on the shaping surface of the cavity, the number of times of shaping a three-dimensional object in the cavity can be increased, that is, the service life of the mold can be drastically improved.

In other words, according to the present invention, there is also provided a mold having a cavity for shaping a three-dimensional object, which comprises a photocured resin of a photocurable resin composition comprising:

(A) a liquid photocurable resin, and (B) at least one reinforcing agent selected from the group consisting of inorganic solid particles having an average particle diameter of 3 to 70 μm and a whisker having an average diameter of 0.3 to 1.0 μm, a length of 10 to 70 μm and an aspect ratio of 10 to 100, and in which the inner surface of the cavity is covered by a film having a thickness of 5 to 1,000 μm.

When the thickness of the solid film is less than 5 μm, an effect obtained by forming the solid film is not satisfactory and a releasing effect and the extension of service life of the mold are not satisfactory. On the other hand, when the thickness of the solid film is more than 1,000 μm, there may occur a tendency that the effect obtained by forming the solid film reaches saturation, the service life of the mold is shortened and the molding accuracy of the mold is lowered.

The material of the solid film may be an organic polymer, metal or metal oxide, for example.

Illustrative examples of the organic polymer include a polyamide resin, a polyamidimide resin, a polyimide resin, a polyacrylic resin, a polyurethane resin, a silicon resin, a fluorinated resin, an epoxy resin, a polystyrene resin, a polyurethaneacrylate resin and the like. They may be used alone or in combination of two or more.

Of these, a polyamidimide resin which may be liquid, a fluorinated acrylic resin such as a copolymer of an alkyl acrylate such as methyl methacrylate and a perfluoroalkyl (meth)acrylate such as perfluorooctyl (meth)acrylate or perfluoroisopropyl (meth)acrylate, which, is a resin soluble in an organic solvent having a relatively low boiling point, and a polyurethane acrylate resin are particularly preferred.

These organic polymers are preferably applied to the inner surface of the cavity of a mold as a solution or liquid in an organic solvent, evaporated/dried or cured to form a solid film on the inner surface of the cavity.

Illustrative examples of the metal and metal oxide include chromium metal, nickel metal, iron metal, zirconium metal, zinc metal, aluminum metal, copper metal, and oxides thereof and alloys thereof.

The solid film formed of one of these materials can be formed on the inner surface of the cavity of a mold by a plating or vapor deposition method.

A method for producing a mold of the present invention from the photocurable composition comprises the steps of:

producing data representing the sections of a mold to be formed, forming a layer of the photocurable resin on a working surface designated to be exposed to light for curing generated based on the data, exposing the layer to light for curing to form a first sectional layer, applying the photocurable resin to this first sectional layer, and exposing the photocurable resin to light for curing to form a second sectional layer and bonding together the first sectional layer and the second sectional layer at the same time.

These operations are repeated several times to produce a desired mold.

The following examples are provided for the purpose of further illustrating the present invention, but are in no way to be taken as limiting.

(Production of urethanated acrylic compound)

888 Grams of isophorone diisocyanate, 906 g of morphgline acrylamide and 1.0 g of dibutyltin laurate were charged into a 5-liter three-mouthed flask equipped with a stirrer, a dropping funnel with a side pipe and a cooling pipe, and the inside temperature was elevated to 80 to 90° C. by an oil bath. A solution prepared by dissolving 0.7 g of methyl hydroquinone in 856 g of glycerine monomethacrylate monoacrylate and mixing them uniformly was charged into the dropping funnel having the side pipe which was maintained at 50° C. in advance, and the contents were stirred to carry out a reaction for 2 hours under agitation while the temperature of the contents of the flask was maintained at 80 to 90° C. in a nitrogen atmosphere. After the temperature of the contents of the flask was reduced to 60° C., 366 g of an adduct of pentaerythritol with 4 moles of propylene oxide which has been charged into the dropping funnel was dropped quickly and a reaction was further carried out at a content temperature of 80 to 90° C. for 4 hours. The thus obtained urethane acrylate oligomer was taken out of the flask while the contents were still hot.

(Preparation of a photocurable composition)

2,020 Grams of urethane acrylate oligomer prepared in the above production, 454 g of morpholine acrylamide and 1,060 g of dicyclopentanyl diacrylate were charged into a 5-liter three-mouthed flask equipped with a stirrer, cooling pipe and dropping funnel with a side pipe, which was then vacuum deaerated and substituted with nitrogen. 118 Grams of 1-hydroxycyclohexylphenyl ketone (IRGACURE 184 manufactured by Chiba Geigy) was added under closed environment and mixed and stirred until it was completely dissolved. The thus obtained resin composition was a colorless, transparent viscous liquid. The viscosity of this liquid at normal temperature was 2,100 cps.

The resulting resin composition was transferred to a 10-liter universal stirrer manufactured by Dalton Co. Ltd., and 27 g of SUPERDINE V201 (manufactured of Takemoto Oil & Fat Co. Ltd.) as a leveling agent, 4,169 g (32%, by volume) of glass beads having an average particle diameter of 15 μm and a relative standard deviation value indicative of sphericity of 0.3, which were treated with an acryl silane coupling agent, and 1,251 g (8% by volume) of an aluminum borate whisker (diameter: 0.5 to 0.7 μm, aspect ratio: 50 to 70) (ALBOREX YS-4, manufactured by Shikoku Kasei Kogyo K.K.) treated with an acryl silane coupling agent were added, stirred and defoamed for 1 day. The thus obtained resin composition for optical shaping had a viscosity at 25° C. of 40,000 cps.

(Production of a mold by an optical stereoshaping method)

Figure 1B:
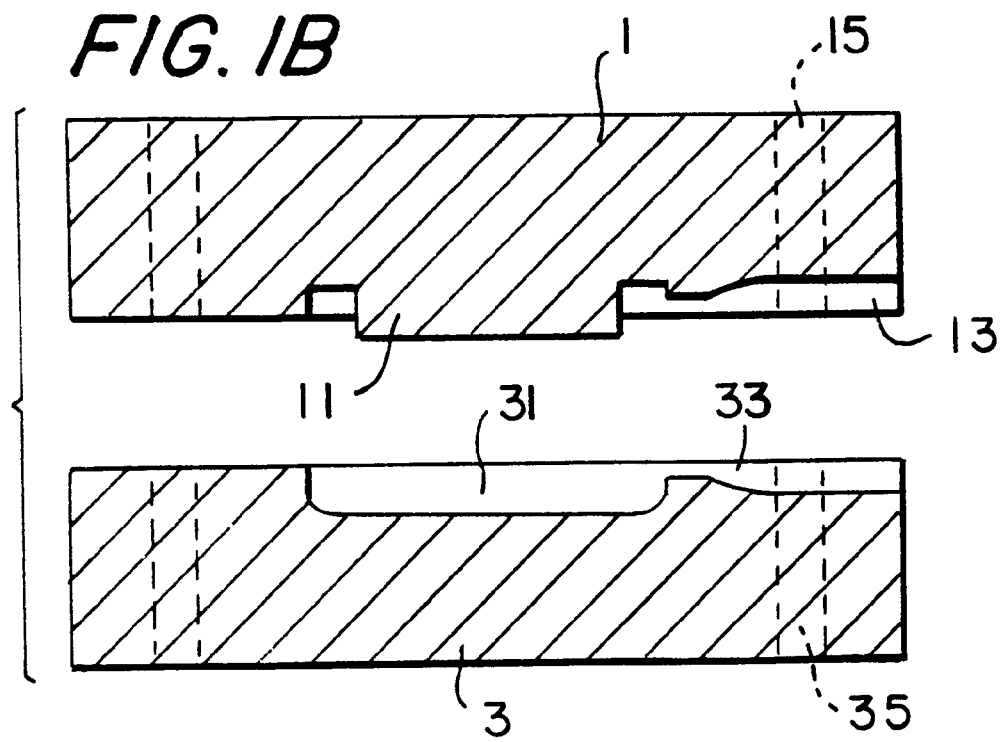
Figure 2A:
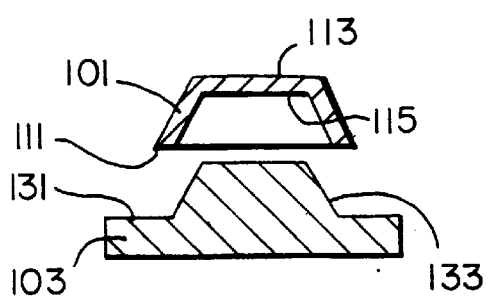
FIG. 2 is a explanation view for the prior art process of producing a simple mold by a model transcription method.
Figure 2B:
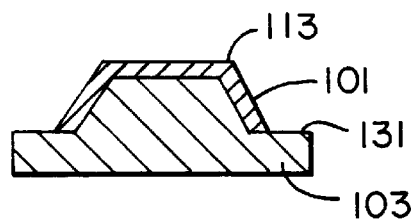
Figure 2C:
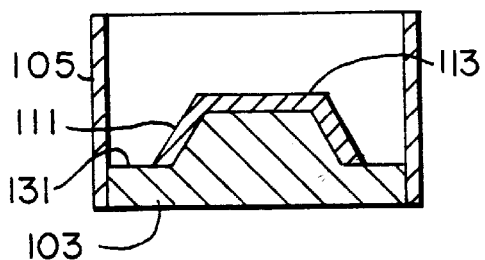
Figure 2D:
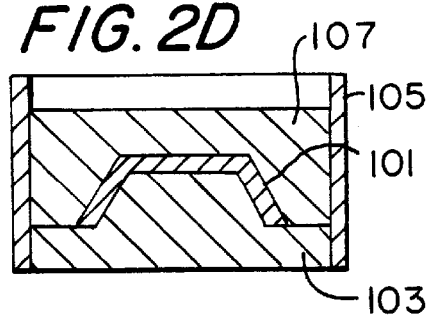
Figure 2E:
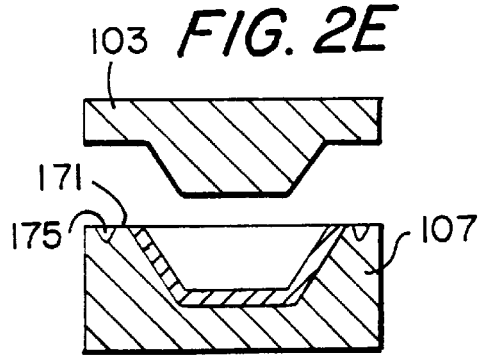
Figure 2F:
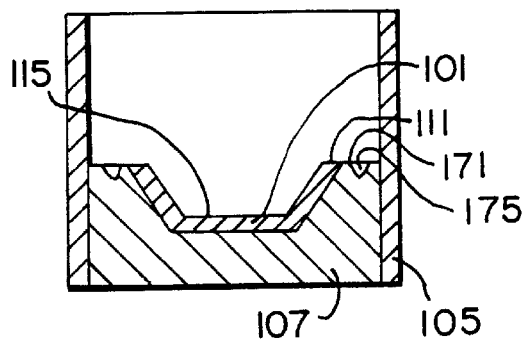
Figure 2G:
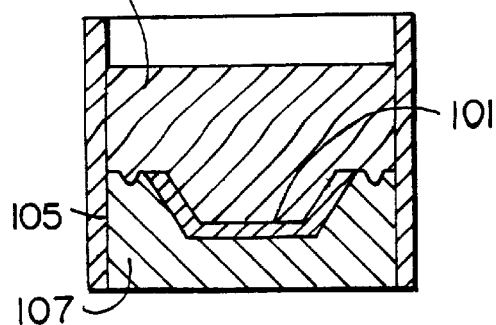
Figure 2H:
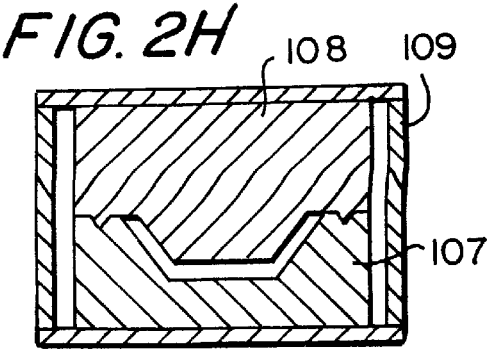

Using the above obtained photocurable resin composition and an ultra high speed, optical shaping system (SOLIFORM 500, manufactured by Teijin Seiki Co. Ltd), a water-cooled Ar laser beam (output: 500 mW, wavelength: 333, 351, 364 mμ) was irradiated perpendicular to the surface of an object to carry out optical shaping with an irradiation energy of 20 to 30 mJ/cm$^2$ at a slice pitch (thickness of a laminate) of 0.05 mm in an average shaping time of 2 minutes per layer to form a cavity/core mold shown in FIG. 1. The thus obtained mold was washed with isopropyl alcohol to remove the resin solution adhered to the mold and post cured with an ultraviolet ray of 3 KW for 10 minutes and then at 150° C. for 30 minutes.

A dumbbell test piece in conformity of JIS standard 7113 was stereoshaped similarly. The thus obtained test piece was measured for its tensile property in accordance with JIS standard K7113 and the results are as follows.

tensile strength 6.3 kg/mm$^2$ tensile elongation 1.4% elastic modulus in tension 1,450 kg/mm$^2$ heat conductivity 0.43 Kcal/m·Hr·° C.

EXAMPLE 1

The above optically stereoshaped cavity/core mold was machined to form an extrusion pin, gate hole and the like and a solution of 30 parts by weight of a copolymer of methyl methacrylate, perfluoropentyl acrylate and butyl acrylate in a ratio of 6/2/2 dissolved in 70 parts by weight of a mixture solvent consisting of methyl cellosolve, methyl ethyl ketone and isopropyl alcohol in a ratio of 60/10/30 was uniformly coated onto the molding surface by a gun spray. One hour after coating, the mold was dried in air and heated in an oven at 80° C. for 30 minutes to obtain a molding mold. The thickness of the polymer film was 30 µm. The molding mold was set on a die-set in an injection molding machine with a pressure of 50 tons and the injection molding was carried out, using an ABS resin as a resin, under conditions of an injection temperature of 200° C. and an injection pressure of 95 Kgf/cm² while a release agent KF96 manufactured by Shin-Etsu Chemical Co. Ltd. was sprayed onto the molding surface to produce a mold at intervals of 1 minute. No damage to the mold was seen at all after 385 shaped products were obtained.

EXAMPLE 2

In place of the fluorine-based acrylate polymer film used in Example 1, a mixture of 60 parts by weight of the above synthesized photocurable resin composition and 40 parts by weight of isopropyl alcohol was sprayed onto the molding surface with a gun spray in the same manner as in Example 1. After coating, the mold was dried under heat in the oven at 80° C. for 30 minutes to remove isopropyl alcohol and post-cured with a 3 KW ultraviolet ray for 10 minutes and then 150° C. for 30 minutes.

The thickness of the polymer film on the molding surface of the thus obtained mold was 40 µm. When an ABS resin was injection molded in the same manner as in Example 1, 250 shaped products were obtained.

EXAMPLE 3

In place of the fluorine-based acrylate polymer film as used in Example 1, a dilute solution prepared by diluting 60 parts by weight of the Coronate L manufactured by Nippon Polyurethane Co. Ltd. with 40 parts by weight of xylene was coated onto the molding surface by a gun spray in the same manner as in Example 1. After coating, the mold was heated in an oven at 80° C. for 30 minutes and then 150° C. for 30 minutes.

The thickness of the polymer film on the molding surface of the thus obtained mold was 60 µm. When an ABS resin was injection molded in the same manner as in Example 1, 230 shaped products could be obtained.

EXAMPLE 4

An ABS resin was injection molded in the same manner as in Example without forming a polymer film. When 10 shaped products were obtained, damage to part of the mold was observed and when a 16th shaped product was molded, the shaped product was adhered to the mold and experiments could not be continued any longer.

EXAMPLE 5

A very thin polymer film was formed in Example 1. The thickness of the film was 3 µm. When injection molding was carried out in the same manner, 17 shaped products were obtained. However, when 15 or more shaped products had been molded, damage to part of the mold was observed and when an 18th shaped product was molded, the complete destruction of the mold was observed.

What is claimed is:

1. A mold having a cavity for shaping a three-dimensional object, which comprises a photocured resin of a photocurable resin composition comprising (A) a liquid photocurable resin, and (B) at least one reinforcing agent selected from the group consisting of inorganic solid particles having an average particle diameter of 3 to 70 µm and a whisker having an average diameter of 0.3 to 1.0 µm, a length of 10 to 70 µm and an aspect ratio of 10 to 100 wherein the inner surface of the cavity is covered by a solid film having a thickness of from 5 to 1000 µm.

2. The mold of claim 1, wherein the reinforcing agent is the inorganic solid particles and is incorporated in an amount of 5 to 70% by volume based on the total volume of the components (A) and (B).

3. The mold of claim 1, wherein the reinforcing agent is the whisker and is incorporated in an amount of 5 to 30% by volume based on the total volume of the components (A) and (B).

4. The mold of claim 1, wherein the reinforcing agent is a combination of the inorganic solid particles and the whisker, and is incorporated in an amount of 5 to 70% by volume based on the total volume of the component (A) and (B).

5. The mold of claim 1, wherein the inorganic solid particle is at least one particle selected from the group consisting of glass particle, talc particle and silica particle.

6. The mold of claim 1, wherein the average particle diameter of the inorganic solid particle is from 10 to 60 µm.

7. The mold of claim 1, wherein the inorganic solid particle has a relative standard deviation defined by the following formula:

$$\text{relative standard deviation} = \sqrt{\frac{\sum_{i=1}^{n}(D_i - \overline{D})^2}{n}} \Big/ \overline{D}$$

wherein Di (µm) is a diameter of the area circle of each particle, $\overline{D}$ (µm) is an average value of the diameter of the area circle defined by the following formula $$\overline{D} = \sum_{i=1}^{n} D_i / n$$

and n is the number of particles of less than 5.

8. The mold of claim 1, wherein the whisker is at least one whisker selected from the group consisting of whisker of aluminum borate or its derivatives, whisker of hydroxy magnesium sulfate or its derivatives, whisker of aluminum oxide and whisker of silicon oxide.

9. The mold of claim 1, wherein the whisker has an aspect ratio of 20 to 70.

10. The mold of claim 4, wherein a ratio of the volume amount of the inorganic solid particles to the volume amount of whisker is between 7:3 to 1:1.

11. The mold of claim 1, wherein the photocured resin has a hardness in terms of the Rockwell surface hardness index of M-40 and a flexural modulus of 400 kg/mm² or more.

12. The mold of claim 1, wherein the photocured resin has a heat conductivity of at least 0.3 kcal/m·hr·° C.

13. The mold of claim 1, wherein the reinforcing agent is surface-treated by at least one coupling agent selected from the group consisting of an aminosilane, an epoxysilane and an acrylsilane.

14. The mold of claim 1, wherein the solid film covering the inner surface of the cavity is of at least one resin selected from the group consisting of a polyamide resin, a polyamidimide resin, a polyimide resin, a polyacrylic resin, a polyurethane resin, a silicon resin, a fluorinated resin, an epoxy resin and a polystyrene resin.

15. The mold of claim 1, wherein the film covering the inner surface of the cavity is of at least one member selected from the group consisting of chromium metal, nickel metal, iron metal, zirconium metal, zinc metal, aluminum metal, copper metal, oxides thereof and alloys thereof.

* * * * *